(12) United States Patent
Gross

(10) Patent No.: US 9,676,134 B2
(45) Date of Patent: Jun. 13, 2017

(54) EXTRUSION HEAD AND METHOD FOR PRODUCING HOLLOW BODIES

(71) Applicant: Heinz Gross, Rossdorf (DE)

(72) Inventor: Heinz Gross, Rossdorf (DE)

(73) Assignee: HEINZ GROSS, Rossdorf (DE)

( * ) Notice: Subject to any disclaimer, the term of this patent is extended or adjusted under 35 U.S.C. 154(b) by 348 days.

(21) Appl. No.: 14/353,037

(22) PCT Filed: Oct. 21, 2012

(86) PCT No.: PCT/EP2012/070834
§ 371 (c)(1),
(2) Date: Jul. 22, 2014

(87) PCT Pub. No.: WO2013/057304
PCT Pub. Date: Apr. 25, 2013

(65) Prior Publication Data
US 2014/0333014 A1  Nov. 13, 2014

(30) Foreign Application Priority Data
Oct. 21, 2011 (DE) .................. 10 2011 116 680

(51) Int. Cl.
*B29C 47/22* (2006.01)
*B29C 47/00* (2006.01)
(Continued)

(52) U.S. Cl.
CPC .......... *B29C 47/22* (2013.01); *B29C 47/0023* (2013.01); *B29C 47/0054* (2013.01);
(Continued)

(58) Field of Classification Search
None
See application file for complete search history.

(56) References Cited

U.S. PATENT DOCUMENTS 3,611,494 A   10/1971   Feuerherm
3,981,672 A   9/1976   Wilson
(Continued)

FOREIGN PATENT DOCUMENTS

| CN | 101500780 A | 8/2009 |
|---|---|---|
| DE | 70 05 561 | 2/1975 |
| DE | 2654001 A1 | 6/1978 |
| DE | 29 41 260 A1 | 5/1981 |
| DE | 30 26 822 A1 | 1/1982 |
| DE | 3639273 A1 | 5/1988 |
| DE | 19903084 C2 | 1/2001 |
| DE | 19931870 A1 | 1/2001 |
| EP | 0945245 A1 | 9/1999 |
| EP | 1685943 B1 | 8/2006 |
| JP | 60 056515 A | 4/1985 |
| JP | 61 175008 A | 8/1986 |

(Continued)

*Primary Examiner* — Monica Huson
(74) *Attorney, Agent, or Firm* — Joyce von Natzmer; Agris & von Natzmer LLP

(57) ABSTRACT

The invention relates to an extrusion head and a method with which the thickness distribution of hollow bodies, for example, can be further improved. The extrusion head consists of at least one mandrel (1) and one nozzle (2), which have a rigid geometry and therefore cannot be varied or can also be deformed flexibly in some areas and form a flow channel (3), wherein the positions of the mandrel (1) and the nozzle (2) can be varied relative to one another, so that the geometry of a discharge gap (s) of the flow channel (3) can be varied while a melt is being discharged, wherein each head part has at least one head section with a uniform cross-sectional area in a discharge area (A) of the extrusion head, and wherein at least one head part has at least two head sections (B) and (C), each of which has a predominantly uniform cross-sectional area within the head section (B), (C), which are spaced axially apart from one another and which have mutually different cross-sectional areas.

13 Claims, 3 Drawing Sheets

Figure 1:
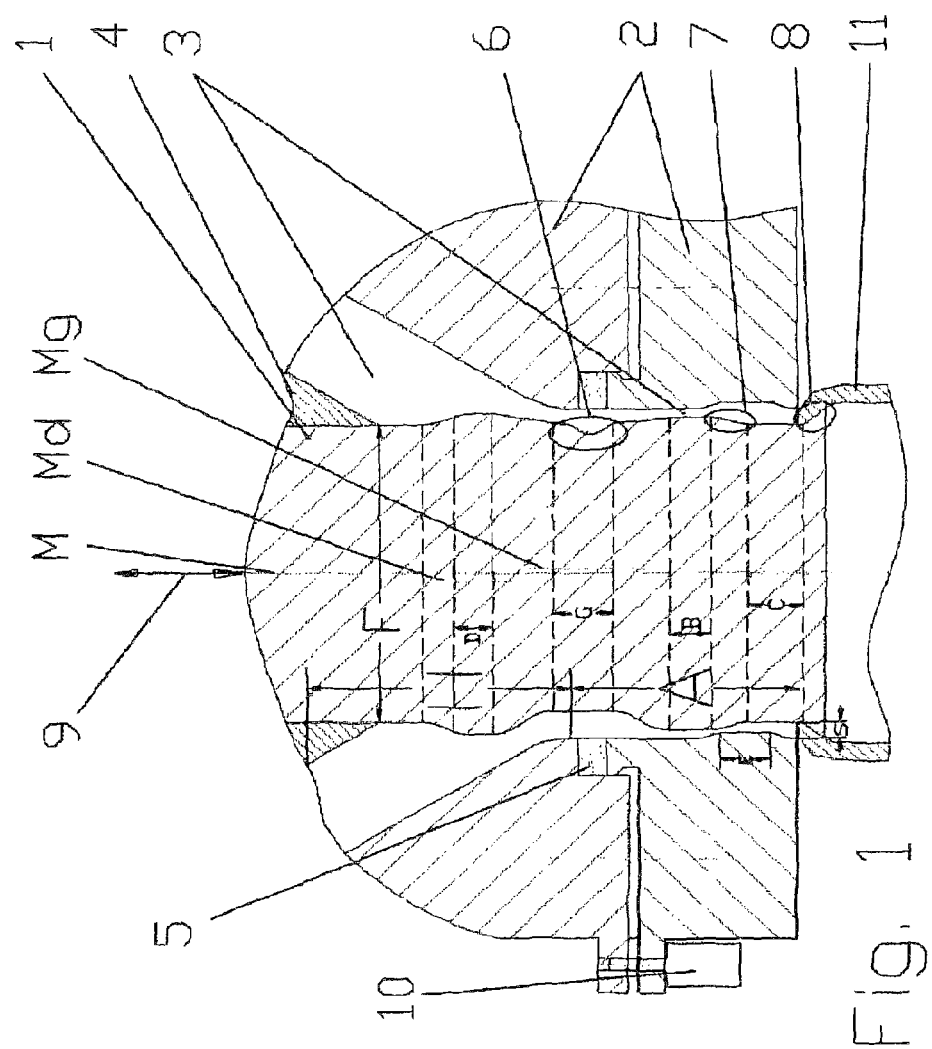

(51) Int. Cl.
    *B29C 47/92*         (2006.01)
    *B29C 49/04*         (2006.01)
    *B29C 47/08*         (2006.01)
    *B29K 101/00*       (2006.01)
    *B29L 23/00*         (2006.01)
    *B29L 31/00*         (2006.01)

(52) U.S. Cl.
    CPC ........ B29C 47/0057 (2013.01); B29C 47/225 (2013.01); B29C 47/92 (2013.01); B29C 49/04 (2013.01); *B29C 47/0852* (2013.01); *B29C 2947/92647* (2013.01); *B29C 2947/92904* (2013.01); *B29K 2101/00* (2013.01); *B29L 2023/00* (2013.01); *B29L 2031/712* (2013.01)

(56) References Cited

U.S. PATENT DOCUMENTS

| | | | |
|---|---|---|---|
| 4,279,857 A * | 7/1981 | Feuerherm | B29C 47/20 264/209.1 |
| 4,382,766 A | 5/1983 | Feuerherm | |
| 6,284,169 B1 | 9/2001 | Feuerherm et al. | |
| 6,354,828 B1 | 3/2002 | Feuerherm et al. | |
| 6,953,333 B1 | 10/2005 | Feuerherm et al. | |

FOREIGN PATENT DOCUMENTS

| | | |
|---|---|---|
| JP | 6-87121 A | 3/1994 |
| WO | 2008/011893 A1 | 1/2008 |

\* cited by examiner

EXTRUSION HEAD AND METHOD FOR PRODUCING HOLLOW BODIES

CROSS-REFERENCE TO RELATED APPLICATIONS

This is the U.S. national stage of International application PCT/EP2012/070834, filed Oct. 21, 2012 designating the United States and claims priority to German application DE 10 2011 116 680.0, filed Oct. 21, 2011.

The invention relates to an extruder head for plastic extruders, in particular for producing parisons for blow-molded containers, wherein the extruder head has two head parts, a first head part being a mandrel and a second head part being a nozzle, and wherein the two head parts are displaceable relative to one another in the axial direction over a discharge region, so that the geometry of a discharge gap of a flow channel situated between the mandrel and the nozzle can be varied and thus the wall thickness of a tubular plastic strand being discharged from the head can also be varied.

Extruder heads are used for discharging a flowable plastic melt in extrusion of plastic extruder heads, so that the plastic melt is discharged at the end of the head with a precisely defined geometry and a desired wall thickness and/or wall thickness distribution. When hollow profiles, for example, tubes, pipes or profiles are to be produced from the plastic melt, the extruder heads require a mandrel and a nozzle surrounding the mandrel. The geometry of the flow channel is predetermined in the discharge region by the geometry of the mandrel and the nozzle. The shaping and the wall thickness of the extruded melt are predetermined by the shape of the discharge gap. The discharge gap is in turn predetermined by the position of an end area of the nozzle relative to the mandrel. For example, to eliminate the unevenness in the local discharge velocities of the composition, which occur over the circumference in a tube, for example, or to deliberately create irregularities, the geometry of the flow channel gap and/or the position of the mandrel relative to the nozzle must be varied under output conditions that are otherwise constant.

In extrusion blow molding, for example, it is advantageous if the wall thickness of the tube can be varied over the circumference of the tube while maintaining a constant discharge velocity to thereby be able to do justice to the different drawing ratios of the molded body to be produced. The goal here is to be able to produce complex molded bodies that have a better thickness distribution than is possible with the state of the art and to do so inexpensively.

STATE OF THE ART

In extrusion blow molding, extruder heads are fixedly flange-mounted on an extruder from which a melt is fed into the tube head, to discharge a tubular melt. Such extruder heads have two head parts at the end, a mandrel and a nozzle, forming an annular flow channel surrounding the mandrel. With the extruder heads used for blow molding, these two head parts have a tapered conical shape in their discharge region, so that the flow channel is also conical in the area of the discharge gap. The discharge gap may be preselected to be larger or smaller by a relative displacement of the one head part relative to the other head part. In this way, the wall thickness of the tube can be varied in the draw-off direction during discharge of the melt (see Thielen, M., Hartwig, K., Gust, P.: Blasformen von Kunststoff-Hohlkörpern [Blow Molding of Hollow Plastic Bodies], Carl Hanser Verlag, Munich, Vienna, ISBN-10: 3-446-2267-0, pages 45 and 46) to make it possible to achieve a uniform wall thickness of the molded part in this way despite different drawing ratios of the molded part in the discharge direction.

Alternatively, it is possible, using the same mold, to produce tubes having a larger or smaller wall thickness, averaged over the circumference.

There are fundamentally two process variants of blow molding, in which either the mandrel is displaced axially in the discharge direction while the nozzle is fixedly connected to the extruder, or the nozzle is displaced while the mandrel is fixedly connected to the extruder. Therefore, in simplification, the mandrel and the nozzle are each referred to as head parts when it does not matter, in the respective context, whether the element referred to as a head part is the mandrel or the nozzle.

In addition, the wall thickness of the tube in the circumferential direction can also be varied with the help of nozzles, which are flexibly deformable around their circumference, as described in DE 2654001 and DE 19931870, for example. This requires an expensive, flexibly deformable nozzle area and corresponding actuators with which this flexible nozzle area is then varied during the discharge of the tube.

Another approach is to use an additional slide that is integrated into the mandrel to influence the radial wall thickness along a circumference (EP 1 685 943 B1). However, a complex mandrel having a slide is also required in this case, and the slide in turn naturally requires an actuator that must triggered by special extra software. Variable thickness differences around the circumference of a tube can be implemented in this way. However, the slide creates an interfering discontinuity in the flow channel, and the elastically deformable nozzles are not suitable for creating great, locally limited differences in the wall thickness of the tube.

Nozzles which are conical at the end in their discharge region are fundamentally always used in these methods in order to be able to effect a change in the wall thickness in the draw-off direction, which is uniform around the circumference by varying the discharge gap, which runs conically in addition to a change in the wall thickness, which is created locally around the circumference. Nozzles that are flexibly deformable around the circumference are also used to produce relatively simple moldings such as canisters or round containers. Dynamic radial wall thickness control systems such as those proposed in DE 2654001, DE 19931870 and/or EP 1 685 943 B1 to improve the thickness distribution in the end product, are now very complex technically and also very expensive accordingly, as indicated above.

The goal of the present invention is therefore to be able to vary the wall thickness of tubes over the circumference without requiring the known expensive and technically complex dynamic radial wall thickness control systems which necessitate the use of additional actuators and special control programs for the actuators and, if possible, without having to accept the disadvantages associated with these methods.

The object of implementing both a dynamic axial wall thickness control and a dynamic radial wall thickness control at the same time in particular, while avoiding the disadvantages of the prior art mentioned above, is achieved according to the invention by the fact that each head part in a discharge region A of the head has at least one region of a uniform cross-sectional area, and at least one head part has at least two head sections B and C, each of which has a uniform cross-sectional area, wherein the two head sections are spaced an axial distance apart and have a cross-sectional area deviating from one another, and wherein the two head parts can be displaced relative to one another in the axial direction, so that the geometry of a flow channel situated between the mandrel and the nozzle and thus also the wall thickness of a tube being discharged from the head can be varied. The cross sectional area of a head section and/or of a section extending axially along a head part is defined in a relevant manner by the circumferential contour and the area content. Deviations in the cross-sectional areas of individual head sections from one another relate to a change in the area content, a change in the circumferential contour or a simultaneous change in both the area content and the circumferential contour. To avoid discontinuous transitions between individual head sections, it is provided that individual, specially profiled head sections are to be connected by transitional head sections, wherein the surfaces between the profiled head sections and the transitional head sections develop into one another continuously and/or tangentially.

In at least one head part, the area content and the circumferential contour of the cross-sectional area at the beginning and end of the discharge region A are ideally approximately the same. However, the cross-sectional areas may also differ slightly because of special profiling, so that the area content and the circumferential contour of the cross-sectional areas may differ slightly.

The discharge region A begins at the point where the stationary head part develops from a conical shape of the feed of the plastic melt into a shape that is cylindrical in first approximation and ends at an outlet end of the stationary head part, which represents a limitation on the discharge gap at the same time.

Sections in which the surfaces of the two head parts run primarily parallel in the axial direction are situated in the discharge region A. The flow channel H for the feed of the plastic melt, which has a conical shape and in which the flow channel gap between the two head parts is many times larger than that in the discharge region A is also situated in front of the discharge region A, as seen in the axial direction.

According to one embodiment of the idea according to the invention, the gap between the surfaces of the stationary and movable head parts, which define the annular gap, remains constant over the circumference of the head and over the axial length of a head section as long as the movable part is not shifted more than the axial length of the respective head section. This does not include limited profilings that are introduced into a head section to influence the flow resistance at specific locations over the circumference of the head section.

In principle, the invention is based on the idea of designing at least one head part not to be conical, but instead to be cylindrical in the region of the output gap, contrary to all textbooks and contrary to the stipulations of all the blow-molding experts. To do so, one must first waive the option of being able to simply influence the thickness of the tube by varying axially the relative position between the conical mandrel and the conical nozzle.

To vary the wall thickness of the tube to be discharged from the head, it is now necessary for the movable head part to have at least two head sections, which have different cross-sectional areas from one another, with which the active flow channel geometry can be varied at the discharge gap through axial displacement of the mandrel. To be able to increase or decrease the average wall thickness at certain locations over the length of the tube, it is necessary for the head to have at least one head section B in the discharge region A, the average distance of the surface from the midline M of the head being greater than that of a third head section C and to have at least one head section G, whose average spacing from the midline M is less than that of a third head section C. The midline of a head section is obtained by connecting the midpoints of the basic point-symmetrical cross-sectional geometries at the beginning and end of a head section to one another, such that local changes in the basic cross-sectional geometry, such as, for example, local profilings of a head section along a circumferential line of this head section, are not taken into account. Possible basic geometries include all the cross-sectional geometries that have point symmetry, such as, for example, circular, oval, square, rectangular or other polygonal shapes.

In order to avoid any discontinuity in the average discharge velocity in displacement of the mandrel, it is provided in an advantageous manner that the cross-sectional area of the opening F of the guide of the movable head part and the cross-sectional area of the end region C of the movable head part shall be identical or shall differ from one another at least by no more than 10%.

To be able to influence the local discharge velocity over the circumference in the desired manner with the method according to the invention, it is advantageous if the movable head part has at least two sections B and G in the discharge region A, whose midlines Mg or M have different positions, or if the movable head part has at least one region G whose midline Mg is a distance of at least 0.1 mm from the midline M of the head part. Different flow resistances, which may be caused by corresponding variations in geometry in other head sections can be compensated again in this way, so that ultimately the tube has the most uniform possible discharge velocity over the circumference, despite the fact that its thickness varies over the circumference of the tube.

To be able to create great differences in thickness at certain locations on the tube without having a very negative effect on neighboring regions, it is advantageous if the movable head part in the discharge region A has at least one region G, where there is at least one profiling, which has an irregular circumferential geometry differing from the basic circular geometry. This is necessary in particular when the molded part should have a region whose degree of drawing is extremely different from that of neighboring regions.

Specifically for compensation of differences in the discharge velocity of the tube over the circumference, it is advantageous if the movable head part has at least one head section D whose midline Md is not in the same position as the midline M and which leaves the flow channel region H and enters the discharge region A of the head only due to a displacement of the movable head part. As long as this head section D is in the flow channel region H, it has only a minor effect on the flow resistance because the flow channel gap is very large in the flow channel region H, so that the relative change in gap due to the change in geometry of the head section D is irrelevant.

In the method according to the invention, the movable head part must be moved further within the discharge region A than is normally customary. This leads to the problem that the tube may catch on the surface of the movable head part protruding above the discharge gap. To reduce this problem, in one embodiment of the idea according to the invention, it is provided that the end of the movable head part is made of Teflon. This is recommended in particular when the movable head part has a radially protruding section on the end of the discharged tube to be able to seal the flow channel gap by a suitable displacement relative to the stationary head part in order to be able to refill a storage container, for example, with melt. In this case, the end of the movable head part may have a conical shape to be able to close the flow channel gap.

Another degree of freedom for altering the gap geometry of the flow channel is obtained if the nozzle is designed in two parts and if an elastic tilt joint is integrated between the two nozzle parts. Then the flow channel geometry may be altered additionally without having to displace the movable head part. This possibility may in turn be utilized advantageously to be able to influence the discharge velocity over the circumference of the head in the desired sense.

The extruder head according to the invention is substantially easier to assemble if the two head parts are connected to one another with the help of the bayonet closure. Then the head part can be flange-mounted on and dismantled from the other head part simply by a rotational movement.

A head part may of course also have an oval or rectangular basic geometry or some other point-symmetrical basic geometry that deviates from the circular shape at the end of the discharge region A of the flow channel and/or at the discharge gap. Again in this case, the flow channel surfaces of the two head parts must of course primarily have flow channel regions whose surfaces are arranged in parallel to be able to implement the desired advantageous wall thickness profiling.

With the extruder head according to the invention, the displaceable head part can also be produced from individual, axially offset sections or panels with a three-dimensional geometry that has been specifically optimized to the respective molding to be produced. The gap width may be varied as a whole as well as the gap width being varied over the circumference by means of a plurality of suitably designed head sections. Thus, by shifting the mandrel, it is possible to vary the thickness of the tube in the draw-off direction as well as that along a circumferential line in the radial direction according to the requirements of a molding to be produced by simply limiting the discharge gap during the discharge of the tube through the customary displacement of the mandrel, due to the fact that differently profiled mandrel regions limit the discharge gap and make it effective for the shaping of the strand of plastic being discharged. If the mandrel is then displaced, the end of the mandrel with the lowest mandrel region emerges from the nozzle and thus loses its influence on the thickness distribution of the tube being discharged. At the same time, however, a new mandrel section enters the upper cylindrical discharge region of the nozzle, its geometry then altering the flow resistance and thus naturally also the flow behavior of the flowable compound.

Moldings with a locally adjusted thickness distribution can therefore also be manufactured with the extruder head according to the invention, although they have regions where there are very sharp local changes in the degree of drawing. Although the flow channel gap of an extruder head according to the invention is additionally altered by local deformation of the nozzle or due to tilting of a nozzle part, substantial differences in thickness in the circumferential direction and in the draw-off direction of the tube can be achieved, such as those which cannot be achieved with the known blow-molding methods. Thus, hollow bodies in which a good thickness distribution cannot be achieved with the known blow-molding methods because of their complex geometry can now be produced with a good thickness distribution.

EXEMPLARY EMBODIMENTS

Figure 2:
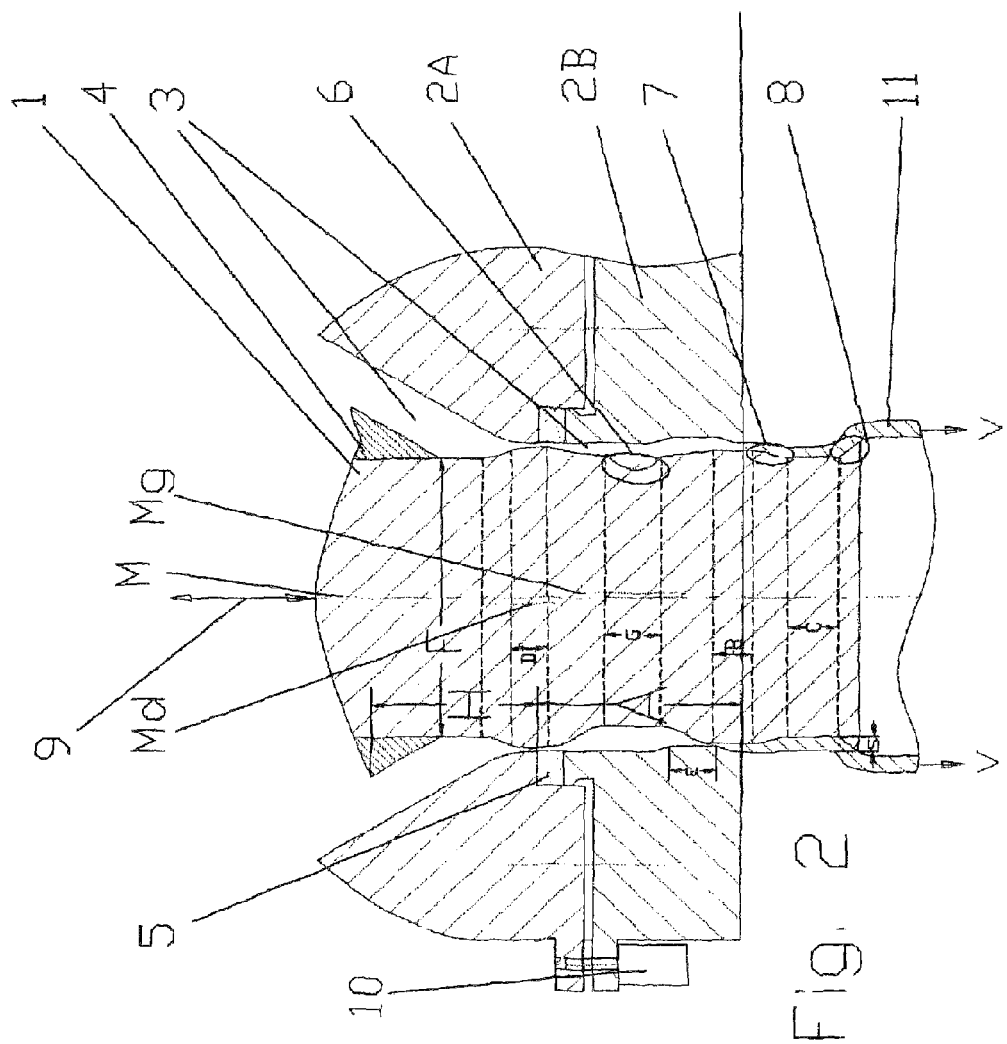
Figure 3:
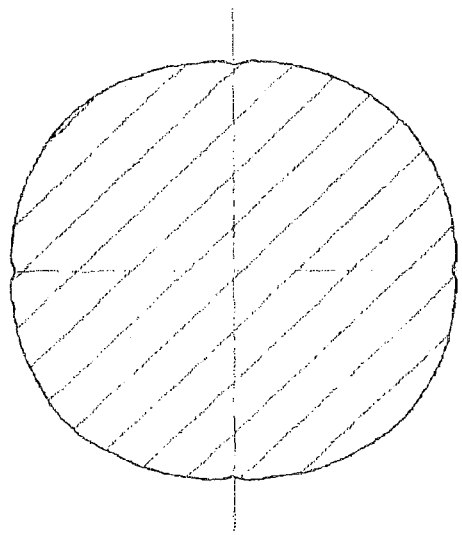
Figure 4:
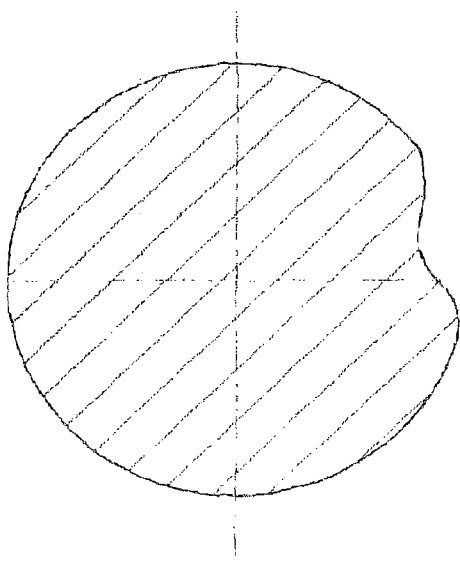

The invention will now be explained in greater detail on the basis of the schematic drawings:

FIG. 1 shows a detail of a head according to the invention in a sectional diagram, FIG. 2 shows the detail from FIG. 1, in which the movable mandrel 1 has been shifted in comparison with FIG. 2, FIG. 3 shows as an example a cross-sectional area of a surface region for producing a rectangular canister, and FIG. 4 shows as an example a cross-sectional area of a surface region for producing a round bottle, which has a pour spout in one location.

As shown in FIG. 1, the extruder head has a first head part, namely a mandrel 1 and a second head part, namely a mandrel 2, bordering a flow channel 3. The head geometry and/or the shape of the annular flow channel 3 between the nozzle and the mandrel may be approximately round, as is usually the case, wherein the mandrel 1 is positioned centrally in the nozzle 2. The mandrel 1 and the nozzle 2 thus have an identical midline M. The nozzle 2 and the mandrel 1 may of course also have any other geometry, such as, for example, a square, rectangular or oval geometry or some other point-symmetrical geometry.

The nozzle 2 is fixedly connected to an extruder (not shown in FIG. 1), while the mandrel 1 can be displaced relative to the stationary nozzle 2. The mandrel 1 and the nozzle 2 each have at least one head section in a discharge region A of the head, these sections having a uniform cross-sectional area within the head section. The mandrel 1 has at least two head sections B, C, D or G which have a uniform geometry within the respective head section B, C, D or G but whose cross-sectional area differs from the cross-sectional area of a neighboring head section C, B, G or D. The axial length of each head section B, C, D or G should be at least 2 mm, preferably even more than 5 mm, so that the head section B, C, D or G will have a sufficient effect on the flow resistance of the compound flowing through the respective head section B, C, D or G.

To facilitate optimization of the flow channel geometry, it may be advantageous if the mandrel 1 is made up of individual disks, so that in optimizing the surface geometry of the mandrel 1, possibly only a single disk need be exchanged, and it is not always necessary to replace the entire mandrel 1.

With the extruder head according to the invention, the mandrel 1 must be moved very far and very rapidly in extreme cases, so the cross-sectional area of the opening F of the mandrel guide 4 should ideally be the same as the cross-sectional area of the head section C or should differ from it by max. 15%. Only in this way is it possible to avoid major changes in the flow channel volume in the head during movement, which would automatically result in a problematical change in the discharge velocity v of the tube 11 at a constant melt flow discharge from the extruder. The same is of course also true of the nozzle on heads with which the nozzle is moved instead of the mandrel. For reasons of simplicity, only the case of the movable mandrel 1 is described below. All the arguments already presented also logically apply to the case when the nozzle 2 is moved but the mandrel 1 is not.

In the case of storage heads, it is necessary for the discharge gap s of the flow channel 3 to be closed at the discharge region of the extruder head when the storage is filled with melt. The axially displaceable mandrel 1 therefore needs a short conical mandrel region 8 at the end. For closing, the mandrel 1 is raised until the end of this conical mandrel region 8 comes in contact with the nozzle 2. For ejection of the melt, as illustrated in FIG. 1, the mandrel 1 is moved down somewhat, forming a discharge gap s of the flow channel 3 at the mandrel end 8, which is determined precisely in advance by the position of mandrel 1. This discharge gap s may then vary to a great extent over the circumference, depending on whether local profilings 6 are present in the mandrel region situated precisely at the end of the nozzle or whether the midline Mg of the head section G does not correspond to the midline of the extruder head.

The travel distance 9 of the mandrel 1 which is required for the process and defines the discharge region A is generally much greater than that with conventional blow-molding methods. For small extruder heads it should be larger than 1 mm at a minimum and for large extruder heads it should be up to 100 mm at a maximum in order to have as many different flow channel regions and/or head sections B, C, D or G as possible be active or inactive. To ensure that the melt will still slide over the conical mandrel end 8 even when utilizing the maximum travel distance 9, i.e., even with the mandrel 1 still pulled out to a great extent, it may be advantageous to manufacture the conical mandrel end 8 of Teflon or at least to provide a layer that promotes sliding on the surface of the conical mandrel section 8.

In systems that do not have a storage head and which therefore eject the tube 11 continuously, the short conical mandrel end 8 is of course not necessary because the discharge gap s of the flow channel 3 must not be closed at any point in time. To then be able to vary the wall thickness of the tube 11 in a targeted manner over the length and over the circumference in accordance with the respective local degrees of drawing of the molding, the mandrel 1 has at least two head sections B and C, each with a uniform cross-sectional area within the head section B and/or C, wherein the cross-sectional areas of the head sections B and C differ from one another. This makes it possible to achieve the result that the discharge velocity v of the tube 11 is the same over the circumference, although the discharge gap s of the flow channel 3 formed by the respective head section B or C at the end of a nozzle 1 varies in size over the circumference.

Ideally the two head parts in the discharge region A each have at least one surface region and/or head section C and E, which is/are proximately cylindrical.

To always achieve the same melt discharge velocity v over the circumference of the extruder head, it may be necessary for the mandrel 1 to have at least one head section B whose average spacing from the midline M of the head is greater than that of a third head section C, and has at least one head section G, whose average spacing from the midline M is less than that of a third head section C. In many cases, it is also advantageous if the movable head part has at least two head sections B and G in the discharge region A, whose midlines Mg or M have different positions. The spacing of the midlines should be at least 0.1 mm for small extruder heads, but it may be larger than 10 mm for large extruder heads. The mandrel 1 may also have very small, locally limited profilings 6. Then the wall thickness of the tube may be varied in a very small region over the circumference to do justice to very locally limited differences in the degrees of drawing in the hollow body. In the case of complex geometries of the hollow body produced from an extruded tube section, it may be necessary for a mandrel section B, C, D, G to have an irregular geometry, which differs from the basic circular geometry over at least 30% of its circumference.

To reduce differences in the discharge velocity of the tube 11 over the circumference, it may be very advantageous if the mandrel 1 has at least one eccentric flow channel section G, which is located outside of the discharge region A of the extruder head and which enters the discharge region A only through displacement of the mandrel 1. The geometry of this flow channel section G must then in turn be coordinated with the geometry of the mandrel region, which is still situated in the discharge region A with a corresponding position of the mandrel, so that despite the fact that the discharge gap s of the flow channel 3 varies greatly, the same velocities of flow v are again obtained over the circumference.

The possibilities for targeted profiling of the wall thickness of the tube 11 are enormously expanded when the nozzle 2 is divided into two parts in the axial direction and there are two nozzle parts 2A and 2B, and if an elastic tilt joint 5 is situated between the two parts 2A, 2B of the nozzle 2, forming a seal with respect to the flowable compound, on the one hand, but on the other hand, allowing the two parts 2A and 2B of the nozzle 2 to be slightly tiltable relative to one another. In conjunction with a drive 10, with which the two nozzle parts 2A and 2B can be tilted relative to one another, an advantageous blow-molding method, in which the discharge gap s of a flow channel 3 of an extruder head having an advantageous parallel or almost parallel discharge region A is varied by tilting a nozzle part 2A, 2B and/or by local deformation of the nozzle 2 during discharge of the tube 11 with the help of suitable control members 10. Profiling of the wall thickness in the discharge direction and in the circumferential direction of the tube 11 can then be achieved, such as that which cannot be achieved with any known method. Thus the wall thickness distribution of hollow bodies, which have extreme differences in the local drawing ratios, can be improved substantially.

FIG. 3 now shows as an example a cross-sectional area of a head section of a head part, which is suitable for discharge of a tube section from which a square region of a molded body can be produced. The cross-sectional areas of regions and/or head sections which are above this region should now have a geometric shape, such that, although there is a difference in wall thickness with the predetermined melt throughout, the velocity v of the tube discharge still remains as constant as possible over the circumference of the tube.

FIG. 4 shows as an example a cross-sectional area of a head section for a round molded body section which has a pour spout or a filling port in an area where the degree of drawing is much greater than that over the remaining circumference of the molded body. Again in this case, the remaining discharge region A of the extruder head must of course be designed, so that the discharge velocity v of the tube 11 is as constant as possible over its circumference. If the first head section of the mandrel 1 is then extracted out of the discharge region A of the extruder head by displacement, for example, then this head section loses its influence on the wall thickness distribution of the tube 11. Instead of that, a new head section enters the region of the discharge gap s of the extruder head, which then has a greater influence on the distribution of the melt than it did at a previous point in time, when it was still situated in the region H of the head, where the flow channel 3 is much larger than in the discharge region A and in particular in the region of the discharge gap s.

The invention claimed is:
1. An extruder head for plastic extruders for producing parisons for blow-molded containers comprising:
 two head parts, wherein
  a first head part is a mandrel; and
  a second head part is a nozzle, and
 the two head parts are adapted to be displaced relative to one another along a discharge region in an axial direction, so that
  a geometry of a discharge gap of a flow channel, which is situated between the mandrel and the nozzle, and thus also a wall thickness of a tubular strand of plastic being discharged from the extruder head, are variable, wherein each head part in the discharge region has at least one head section with a uniform cross-sectional area, and at least one head part has at least two head sections, each having a cross-sectional area that remains uniform within the head section and being spaced a distance from one another axially and having a different cross-sectional area from one another, wherein at least one of the two head parts is a movable head part and wherein the cross-sectional area of an opening of a guide of the movable head part differs by less than 10% from the cross-sectional area of an end region of the movable head part.

2. The extruder head according to claim 1, wherein at least in the case of one head part, the cross-sectional areas at a beginning and at an end of the discharge region are approximately the same.

3. The extruder head according to claim 1, wherein the extruder head has in the discharge region at least three head sections, a first head section having a surface whose average distance from a midline of the extruder head is greater than that of a third head section and at least one further head section whose average distance from the midline of the extruder head is smaller than that of the third head section.

4. The extruder head according to claim 1, wherein the movable head part is the mandrel.

5. The extruder head according to claim 1, wherein the movable head part has at least two sections in the discharge region, wherein midlines of the at least two sections are in different positions.

6. The extruder head according to claim 1, wherein the movable head part has at least one head section, wherein a midline of the at least one head section is spaced at least 0.1 mm from the midline of the movable head part.

7. The extruder head according to claim 1, wherein the movable head part in the discharge region has at least one head section, in which there is at least one region, which has a point-symmetrical geometry that deviates from the circular geometry.

8. The extruder head according to claim 1, wherein the movable head part has at least one head section whose midline is not in the same position as the midline of the extruder head and which enters the discharge region of the extruder head only through displacement of the moveable head part.

9. The extruder head according to claim 1, wherein the end of the movable head part is made of TEFLON.

10. The extruder head according to claim 1, wherein the nozzle is divided into two parts, and there is an elastic tilt joint between the two nozzle parts with which a nozzle part can be tilted relative to the other nozzle part.

11. The extruder head according to claim 1, wherein the extruder head has a bayonet closure for flange connection of the nozzle.

12. The extruder head claim 1, wherein the discharge gap has an oval or a rectangular cross-sectional geometry or some other point-symmetrical geometry at the end of the discharge region of the flow channel.

13. A method for producing hollow bodies by blow molding comprising providing an extruder head according to claim 1 and producing a hollow body, wherein in addition to a change in the gap of the flow channel due to the displacement of the three-dimensional profile head part, the thickness distribution of the tube is also varied by local deformation of the nozzle part or by tilting of the nozzle part with help of suitable control members while the tube is being discharged.

* * * * *